May 18, 1926.
A. S. HAINSWORTH
WORK HOLDING CLAMP
Filed Oct. 27, 1925
1,585,490
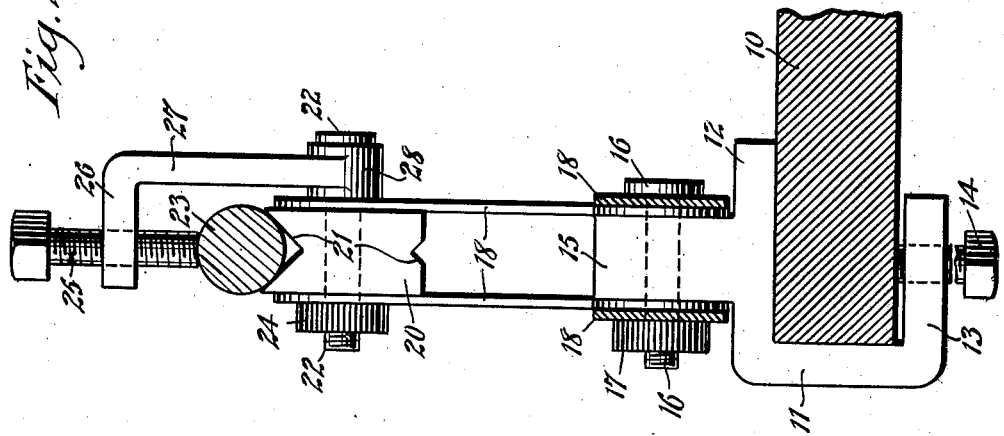
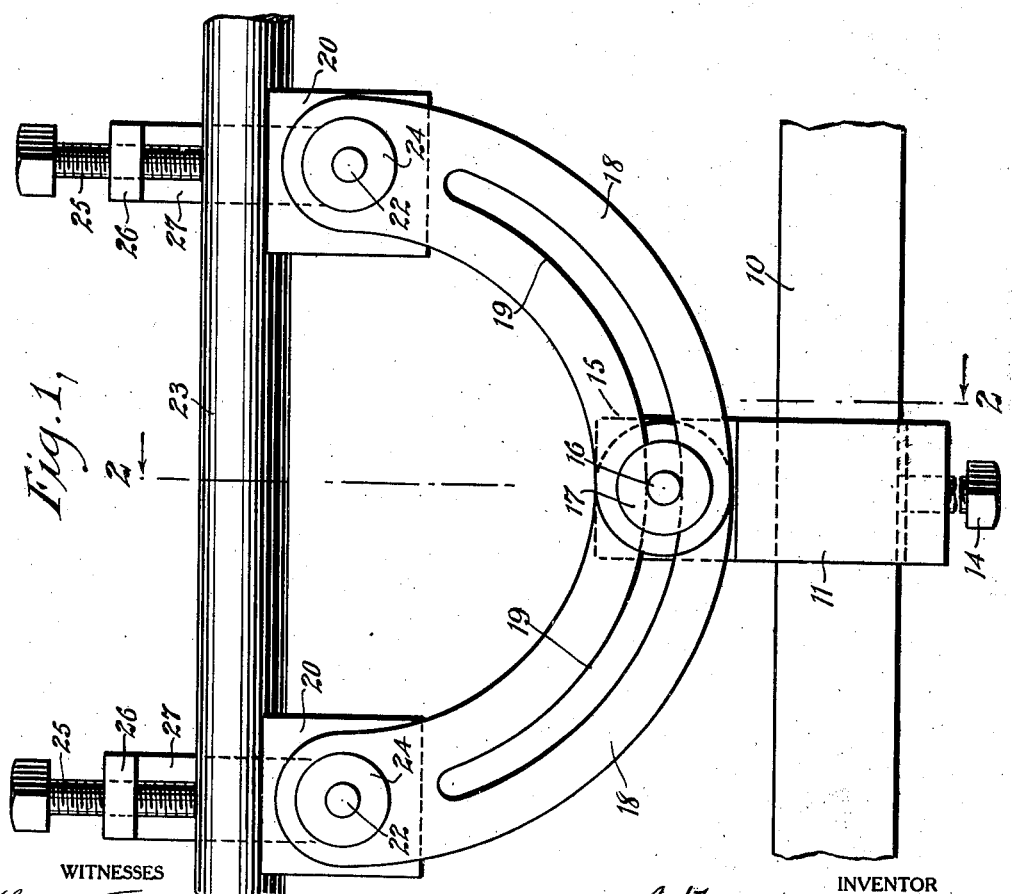
WITNESSES
INVENTOR
Arthur S. Hainsworth
BY
ATTORNEYS Patented May 18, 1926.

1,585,490

UNITED STATES PATENT OFFICE.

ARTHUR S. HAINSWORTH, OF WEST PITTSBURG, PENNSYLVANIA.

WORK-HOLDING CLAMP.

Application filed October 27, 1925. Serial No. 65,200.

The clamp of the present invention is capable of a wide and varied field of utility. It is adapted for holding work of various regular and irregular shapes, and for holding said work in numerous positions of adjustment in order to present it at a convenient angle to the operator.

An object of the invention is to provide a substantially universally adjustable clamping device in which a minimum number of adjustment screws are used. Preferably a single screw holds several parts in properly adjusted position.

A further object of the invention is to provide a clamp of extremely simple practical construction which will be rugged and durable in use, which may be manufactured with comparative economy, and which may be readily manipulated to effect the necessary adjustments for properly engaging it with a piece of work to be held.

With the above-noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a view in side elevation of a clamp embodying the invention, showing a straight piece of work held thereby; and Fig. 2 is a vertical sectional view on the staggered line 2—2 of Fig. 1.

The clamp is preferably portable and capable of attachment to any ordinary work-bench or table. I have used the reference numeral 10 to designate a bench or table, and the numeral 11 to indicate the stationary base portion of the clamp. This base portion includes a pair of parallel arms 12, 13 adapted to straddle the table. Arm 12 rests flatly on the upper surface of the table, while arm 13 is disposed subjacent the table and carries a clamping screw 14 for securing the base firmly in place. Rising from the base 11 is a block portion 15 through which works a screw 16 carrying a clamping nut 17.

Pairs of adjustable arms 18 are provided, said arms being preferably of arcuate shape, and having arcuate slots 19 extending throughout the major portion of their length. At each side of the block 15 the ends of a pair of these arms are overlapped, bringing the slots 19 into registration for the reception of the screw 16. Thus by tightening the nut 17, all four of the arms 18 are locked against movement. The slotted construction of the arms permits adjustment either by sliding them on the screw 16, or by swiveling them on the screw, so that it will be apparent that a very wide range of adjustments is possible.

Between the free ends of each pair of arms 18, I mount a block 20, this block being preferably of square or other polygonal shape, and being formed with any suitable number of work-engaging grooved faces 21. The block may be rotated upon a screw 22 to present any one of the faces 21 in proper position to receive the work designated at 23. A clamping nut 24 on the screw 22 is utilized to lock the block 20 in any desired position of adjustment. Co-acting with blocks 20 to retain a piece of work, are work-engaging screws 25 carried in the short arms 26 of L-brackets 27, the longer arms of the latter being formed with hub portions 28 pivotally adjustable on the screws 22. It will thus be apparent that both blocks 20 and associated work-engaging screws 25 may be retained in properly adjusted position by tightening the nut 24.

From the foregoing description it will be evident that the clamping device is adapted for holding work of various shapes and sizes, and that such work when once received in the bracket may be tilted to any angle by swinging the arms 18 about the screw 16 as a center. It is also to be noted that there are only three screws for locking all of the adjustable parts of the bracket in proper position. The nuts 24 upon tightening, retain both the brackets 27 and the work-receiving blocks 20 in any predetermined position of adjustment, while after the arms 18 have been adjusted, tightening of the nut 17 will hold all four of them against movement.

Various changes and alterations might be made in the general form and arrangement of parts described, without departing from the invention. Hence I do not wish to limit myself to the details set forth, but shall consider myself at liberty to make such changes and alterations as fairly fall within the spirit and scope of the appended claims.

I claim—

1. A work-holding clamp including pairs of arms rotatably and slidably adjustable relatively to a common support, and work-engaging members carried at the free ends of the arms, said members comprising blocks rotatably adjustable between the ends of the arms, said blocks being of polygonal shape and formed with a plurality of work-engaging faces.

2. A work-holding clamp including pairs of arms rotatably and slidably adjustable relatively to a common support, and work-engaging members carried at the free ends of the arms, said members comprising blocks rotatably adjustable between the ends of the arms, clamping screws for coaction with the blocks, said screws being carried by members pivotally adjustable about the center on which the blocks rotate.

3. A work-holding clamp including pairs of curved arms, said arms having longitudinally extending slots therein, the ends of the arms of the two pairs overlapping, a screw passed through the registering slots, a binding nut for tightening the screw to retain all of the arms in a predetermined position of adjustment, and work-engaging members carried at the free ends of the arms, said work-engaging members comprising blocks, screws passed through the blocks upon which screws the latter are rotatably adjustable.

4. A work-holding clamp including pairs of curved arms, said arms having longitudinally extending slots therein, the ends of the arms of the two pairs overlapping, a screw passed through the registering slots, a binding nut for tightening the screw to retain all of the arms in a predetermined position of adjustment, and work-engaging members carried at the free ends of the arms, said work-engaging members comprising blocks, screws passed through the blocks upon which screws the latter are rotatably adjustable, L-brackets including hub portions mounted on the screws, and offset arms carrying clamping screws for co-action with the blocks.

5. A work-holding clamp including pairs of curved arms, said arms having longitudinally extending slots therein, the ends of the arms of the two pairs overlapping, a screw passed through the registering slots, a binding nut for tightening the screw to retain all of the arms in a predetermined position of adjustment, and work-engaging members carried at the free ends of the arms, said work-engaging members comprising blocks, screws passed through the blocks upon which screws the latter are rotatably adjustable, L-brackets including hub portions mounted on the screws, and offset arms carrying clamping screws for co-action with the blocks, a binding nut associated with the screw which holds the blocks and L-brackets, whereby said blocks and brackets may be simultaneously locked in adjusted position by tightening the nut.

6. A work-holding clamp including a portion adapted to be secured to the edge of a work-bench, an extension rising from said portion, a screw passed through said extension, pairs of curved and slotted arms mounted for sliding and rotational adjustment on the screw, a clamping nut for retaining all of said arms in adjusted position and work-engaging elements adjustably carried at the free ends of the pairs of arms, said work-engaging elements including clamping screws and blocks having a plurality of work-receiving faces.

7. A work-holding clamp including a portion adapted to be secured to the edge of a work-bench, an extension rising from said portion, a screw passed through said extension, pairs of curved and slotted arms mounted for sliding and rotational adjustment on the screw, a clamping nut for retaining all of said arms in adjusted position, work-engaging elements adjustably carried at the free ends of the pairs of arms, said work-engaging elements including clamping screws and blocks having a plurality of work-receiving faces, and means for presenting any of the work-receiving faces of the blocks in position for co-action with the clamping screws.

ARTHUR S. HAINSWORTH.